J. G. GRAHAM.
POWER DRIVEN TIRE PUMP.
APPLICATION FILED JUNE 23, 1920.

1,382,722. Patented June 28, 1921.

John G. Graham, INVENTOR.

BY

Shepherd & Campbell ATTORNEYS.

UNITED STATES PATENT OFFICE.

JOHN G. GRAHAM, OF TOMAH, WISCONSIN.

POWER-DRIVEN TIRE-PUMP.

1,382,722.                Specification of Letters Patent.      Patented June 28, 1921.

Application filed June 23, 1920.  Serial No. 391,108.

*To all whom it may concern:*

Be it known that I, JOHN G. GRAHAM, a citizen of the United States, residing at Tomah, in the county of Monroe and State of Wisconsin, have invented certain new and useful Improvements in Power-Driven Tire-Pumps, of which the following is a specification, reference being had therein to the accompanying drawings.

This invention relates to tire pumps and more particularly to a pump constructed in such manner as to be operated by one of the driving wheels of an automobile.

It is the object of the invention to provide a pump of this type embodying improvements over known devices of the same nature by virtue of which a highly efficient article is produced. The advantageous features will be set forth in the detailed description, which follows.

In the accompanying drawing.

Like numerals designate corresponding parts throughout the several figures of the drawing.

Figure 1:
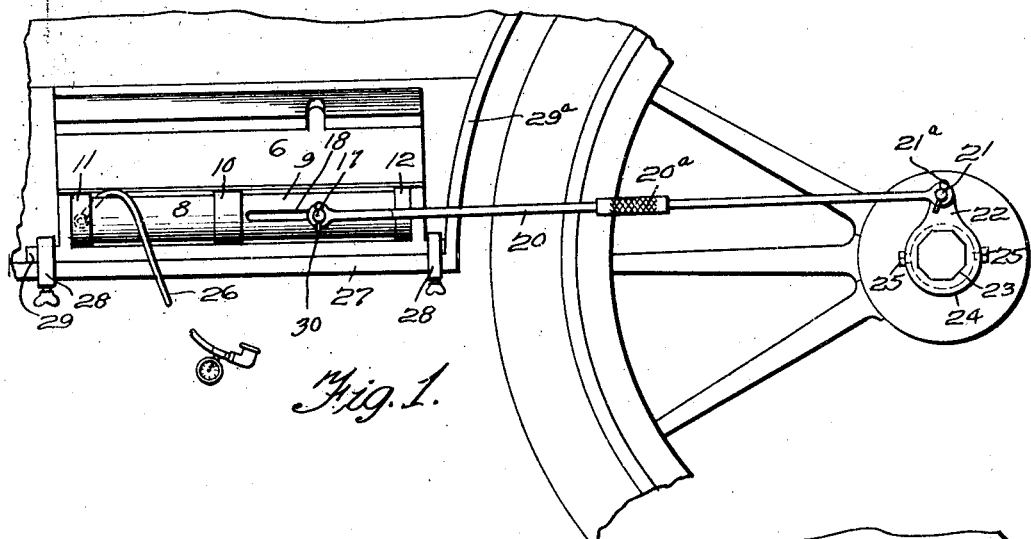
Figure 1 is a view illustrating the pump in side elevation and showing a part of an automobile to which the same is applied.
Figure 2:
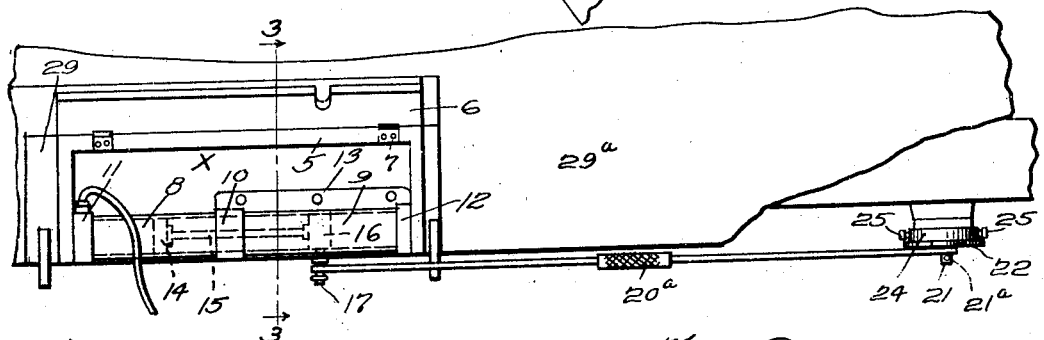
Fig. 2 is a plan view thereof.
Figure 3:
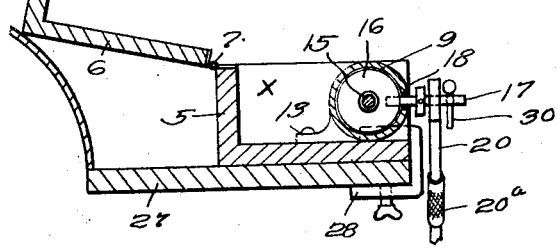
Fig. 3 is a transverse vertical section upon line 3—3 of Fig. 2 looking in the direction indicated by the arrow.

One object of the invention is to provide a pump of the character indicated secured within a containing casing or box, the latter being provided with means whereby it may be easily and quickly secured to the running board of an automobile, in such manner as to hold the pump rigidly in place. The casing or box serves as a container for the other elements necessary to operatively connect the plunger of the pump with the hub of one of the rear wheels and for the flexible tube by which the air is conducted to the tires. Thus, when the device is not in use, it may be safely stowed away in the tool box of the automobile and the pump cylinder will be protected from contact with tools and like articles which might dent the same, it being well known that storage of air pumps in tool boxes in the ordinary way results in their rapid deterioration, owing to the fact that the thin tubing of which they are constructed soon becomes dented and out of round with the result that air leakage occurs.

In the drawings 5 designates a box or casing the top and front of which are open. A lid 6 is adapted to close this casing, said lid being hinged to the case 5 at 7. The pump comprises a pump cylinder 8 and a guide cylinder 9, these cylinders being united by a casting 10, which together with the end castings 11 and 12 are carried by a plate or flange 13 that is secured to the bottom of the box 5. A plunger or piston 14 is operative in the pump cylinder 8 and is connected by a piston rod 15 with a guide disk 16, which is mounted to travel in the guide cylinder 9. The guide disk 16 has a stud 17 outstanding from its side which travels in a slot 18 formed in the side of the cylinder 9. This stud 17 is connected by a link or connecting rod 20 with a wrist-pin 21 of a crank 22. The crank 22 has an angular opening 23 formed in its hub 24 which conforms to the shape of the hub cap of the particular type of automobile upon which the device is being used. Set screws 25 provide means for holding the hub 24 in place. The connecting rod 20 is preferably made in two sections united by a coupling 20ª. This renders it possible to place the two sections of the connecting rod in the space in the rear of the box 5 along with the crank 22 and the flexible tubing 26 by which the air is conducted from the pump cyinder to the tires to be inflated.

Thus it will be seen that the entire apparatus is in the form of a kit adapted to be carried in the tool box of an automobile. When the pump is to be used, the box 5 is placed upon the running board 27 and clamps 28 are engaged with the running board and with projecting end portions 29 of the box 5. This construction renders it possible to shift the box and the pump contained therein bodily back and forth so that the connecting rod 20 will clear the edge of the fender 29ª. The crank 22 is then slipped upon the hub cap 23 and the set screws 25 tightened. The connecting rod is assembled by screwing the two halves thereof into engagement with the coupling 20ª and one end of the connecting rod is engaged with the wrist pin 21 and secured against accidental displacement by a cotter pin 21ª and the other end of the connecting rod is engaged with the stud 17 and held against accidental displacement therefrom by a cotter pin 30.

The fit between the ends of the connecting rod and the stud 17 and the wrist pin 21 is designedly such as to permit limited lateral play between these parts, so that great care in alinement of the pump is rendered unnecessary.

This arrangement renders it possible to use the device upon either running board, so that if the wheel shown in Fig. 1 happens to be the one, the tire of which is in need of inflation, the device may be shifted to the running board upon the opposite side of the car so that the other rear wheel may be used as the driving element. When this is done the pump will be suspended from the under side of the running board by means of the clamps 28 and the stud 17 will then project outwardly from the running board in the same way that it did in its former location.

When packing the device in kit formation the stud 17 may be removed and placed in the casing 5 or it may be permitted to remain in position and the front edge of the cover of the box may be slotted as indicated at 6ª, to clear said stud.

From the foregoing description it will be seen that this device provides an article of exceedingly compact form, capable of being packed into kit formation and yet presenting a structure of great rigidity and strength when brought into assembled relation, ready for operation. It is to be understood that a double action pump may be used if desired since single and double action tire pumps are common in the art.

It is to be understood that the invention is not limited to the precise construction set forth but that it includes within its purview whatever changes fairly come within the terms or the spirit of the appended claims.

Having described my invention, what I claim is:

1. A device of the character described comprising a box like casing having an open top and open front side, a cover of L shape in cross section adapted to close said top and hinged along the rear edge of said box, a pump disposed longitudinally within the casing adjacent the open front side thereof and comprising an element projecting laterally beyond said casing, a crank adapted to be secured to the driving wheel of an automobile and a connecting rod extending between said crank and the laterally extending element of the pump, said casing having a flat bottom adapted to rest upon the running board of an automobile and means for clamping said casing to the running board of an automobile.

2. A structure as recited in claim 1 wherein said connecting rod is made in two parts each of which is adapted to fit within said casing.

3. A structure as recited in claim 1 wherein said casing is provided with projecting portions extending beyond the ends thereof and clamps adapted to engage said projecting portions and to clamp the same to the running board of an automobile either upon the upper side of the running board or upon the under side thereof, to adapt the structure for use upon either side of the automobile.

In testimony whereof I hereunto affix my signature.

JOHN G. GRAHAM.